(12) United States Patent
Davidchuk et al.

(10) Patent No.: US 10,452,244 B2
(45) Date of Patent: Oct. 22, 2019

(54) SYSTEMS AND METHODS OF OPTIMIZING DELIVERY OF FORM FACTOR SPECIFIC CONTENT

(71) Applicant: salesforce.com, inc., San Francisco, CA (US)

(72) Inventors: Matthew Davidchuk, San Francisco, CA (US); David M. Brady, Oakland, CA (US); Richard Perry Pack, III, San Francisco, CA (US); Benjamin Snyder, Oakland, CA (US)

(73) Assignee: salesforce.com, inc., San Francisco, CA (US)

( * ) Notice: Subject to any disclaimer, the term of this patent is extended or adjusted under 35 U.S.C. 154(b) by 662 days.

(21) Appl. No.: 14/703,770

(22) Filed: May 4, 2015

(65) Prior Publication Data

US 2016/0328132 A1    Nov. 10, 2016

(51) Int. Cl.
*G06F 3/0484*    (2013.01)
*G06F 3/0482*    (2013.01)
*G06F 3/0488*    (2013.01)

(52) U.S. Cl.
CPC ........ *G06F 3/04847* (2013.01); *G06F 3/0482* (2013.01); *G06F 3/0488* (2013.01)

(58) Field of Classification Search
CPC ... G06F 3/04847; G06F 3/0482; G06F 3/0488
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |

(Continued)

OTHER PUBLICATIONS

Mario Bisignano et al., "Dynamically Adaptable User Interface Generation for Heterogeneous Computing Devices," 2005, Springer, High Performance Computing and Communications, pp. 1000-1010.*

*Primary Examiner* — Dino Kujundzic
(74) *Attorney, Agent, or Firm* — Holland & Hart LLP

(57) ABSTRACT

The technology disclosed describes systems and methods for optimizing delivery of form factor specific content for users in different environments, such as desktop computer browsers and mobile device applications. The technology further discloses systems and methods for providing support for developers whose goal is to render specific implementations of a user interface to deliver distinct user interface experiences.

23 Claims, 21 Drawing Sheets

(56) References Cited

U.S. PATENT DOCUMENTS

| | | |
|---|---|---|
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,069,497 B1 | 6/2006 | Desai |
| 7,181,758 B1 | 2/2007 | Chan |
| 7,246,374 B1* | 7/2007 | Simon ............... G06F 9/543 |
| | | 713/167 |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,603,483 B2 | 10/2009 | Psounis et al. |
| 7,620,655 B2 | 11/2009 | Larsson et al. |
| 7,698,160 B2 | 4/2010 | Beaven et al. |
| 7,779,475 B2 | 8/2010 | Jakobson et al. |
| 7,851,004 B2 | 12/2010 | Hirao et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,578,278 B2* | 11/2013 | Rauh ................ G06F 8/38 |
| | | 715/741 |
| 8,646,103 B2 | 2/2014 | Jakobson et al. |
| 8,756,275 B2 | 6/2014 | Jakobson |
| 8,769,004 B2 | 7/2014 | Jakobson |
| 8,769,017 B2 | 7/2014 | Jakobson |
| 8,893,078 B2* | 11/2014 | Schaude ............ G06Q 10/06 |
| | | 705/1.1 |
| 9,736,143 B2* | 8/2017 | Bocanegra Alvarez ............ |
| | | H04L 63/0815 |
| 2001/0044791 A1 | 11/2001 | Richter et al. |
| 2002/0072951 A1 | 6/2002 | Lee et al. |
| 2002/0080192 A1* | 6/2002 | King .................. G06F 3/0481 |
| | | 715/811 |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0032409 A1* | 2/2003 | Hutcheson .......... G06Q 30/02 |
| | | 455/414.1 |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0167234 A1* | 9/2003 | Bodmer ............. G06Q 20/382 |
| | | 705/51 |
| 2003/0187921 A1 | 10/2003 | Diec |
| 2003/0189600 A1 | 10/2003 | Gune et al. |
| 2003/0200254 A1* | 10/2003 | Wei .................. G06F 9/4443 |
| | | 709/203 |
| 2003/0204427 A1 | 10/2003 | Gune et al. |
| 2003/0206192 A1 | 11/2003 | Chen et al. |
| 2003/0225730 A1 | 12/2003 | Warner et al. |
| 2003/0229623 A1* | 12/2003 | Chang ............... G06F 21/6218 |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2007/0180362 A1* | 8/2007 | Hunt ................. G06F 9/4443 |
| | | 715/210 |
| 2008/0201659 A1* | 8/2008 | Shen ................ G06F 9/4443 |
| | | 715/778 |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2009/0287962 A1* | 11/2009 | Bakekolo ........... G06F 11/079 |
| | | 714/38.14 |

(56) References Cited

U.S. PATENT DOCUMENTS

| | | | |
|---|---|---|---|
| 2011/0025706 A1* | 2/2011 | Etelapera | G06F 3/1438 345/619 |
| 2011/0218958 A1 | 9/2011 | Warshavsky et al. | |
| 2011/0247051 A1 | 10/2011 | Bulumulla et al. | |
| 2012/0042218 A1 | 2/2012 | Cinarkaya et al. | |
| 2012/0131683 A1* | 5/2012 | Nassar | G06F 17/301 726/28 |
| 2012/0233137 A1 | 9/2012 | Jakobson et al. | |
| 2012/0290407 A1 | 11/2012 | Hubbard et al. | |
| 2013/0031470 A1* | 1/2013 | Daly, Jr. | G06F 17/30867 715/243 |
| 2013/0080887 A1* | 3/2013 | Hou | G06F 9/455 715/273 |
| 2013/0212497 A1 | 8/2013 | Zelenko et al. | |
| 2013/0247216 A1 | 9/2013 | Cinarkaya et al. | |
| 2014/0289640 A1* | 9/2014 | Poornachandran | G06F 17/212 715/745 |
| 2014/0380137 A1* | 12/2014 | Zhang | G06F 17/30905 715/202 |
| 2015/0040098 A1* | 2/2015 | Akins | G06F 8/36 717/106 |

\* cited by examiner

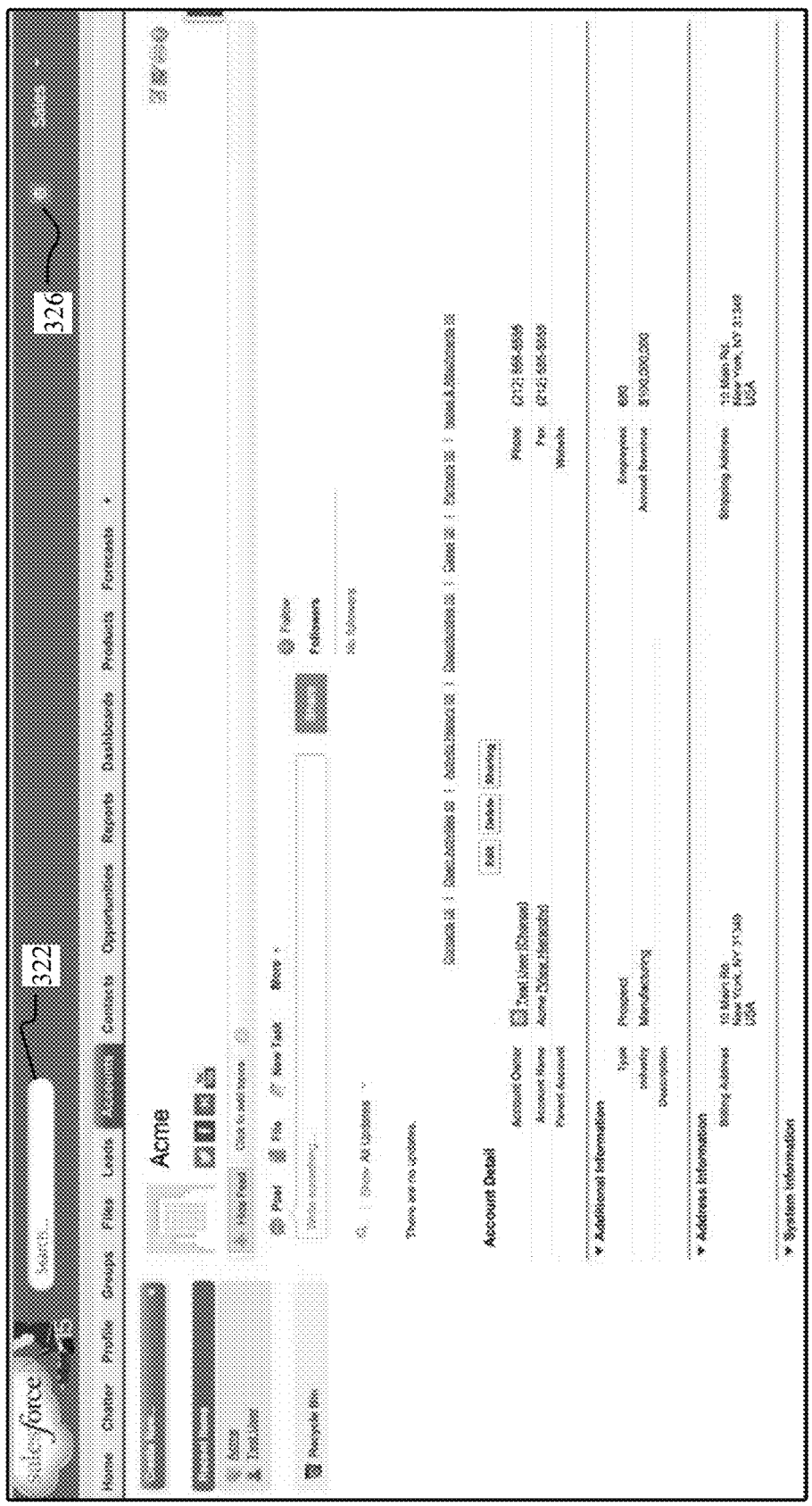
Fig. 3 Desktop UI Example

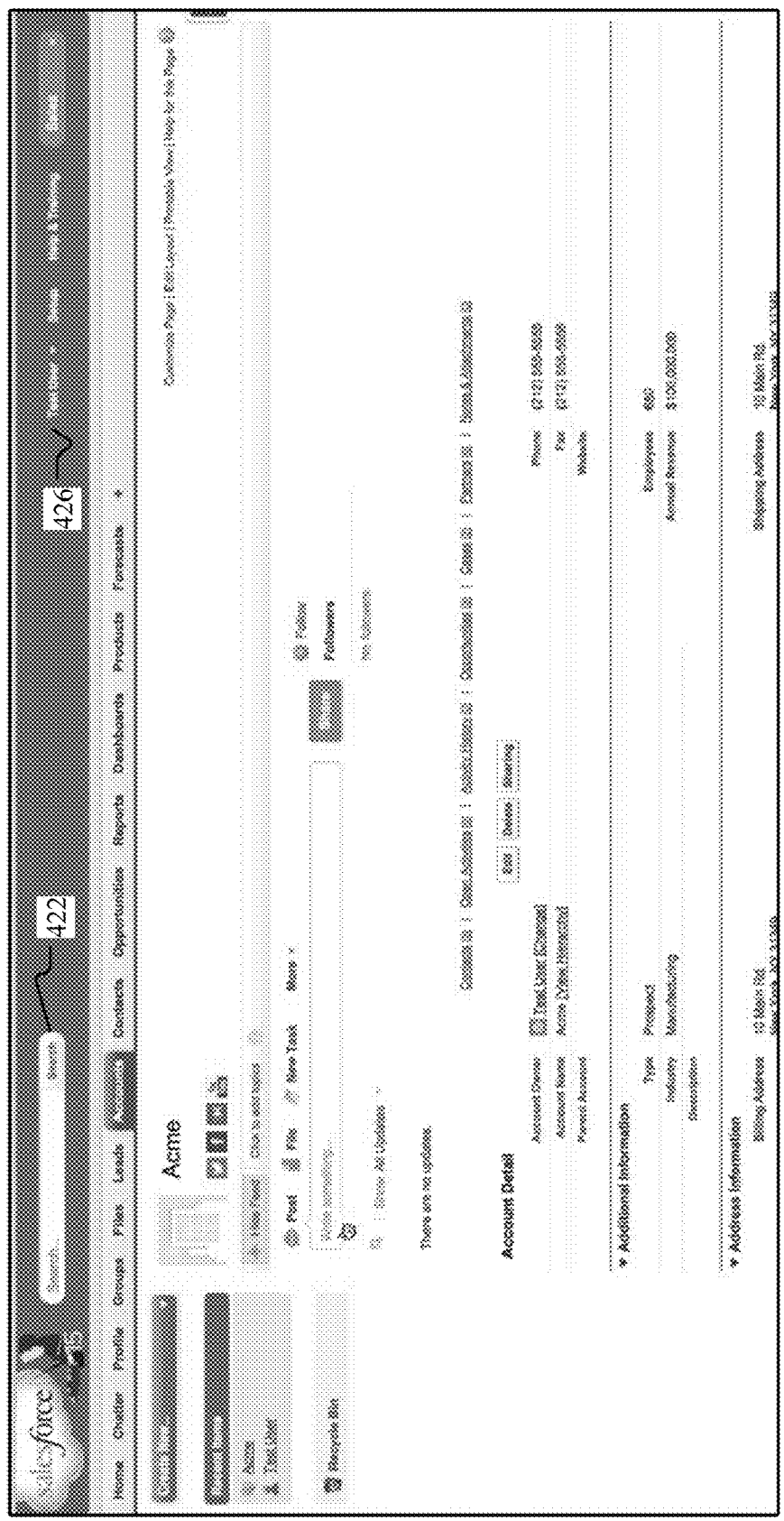
Fig. 4 Aloha Example UI

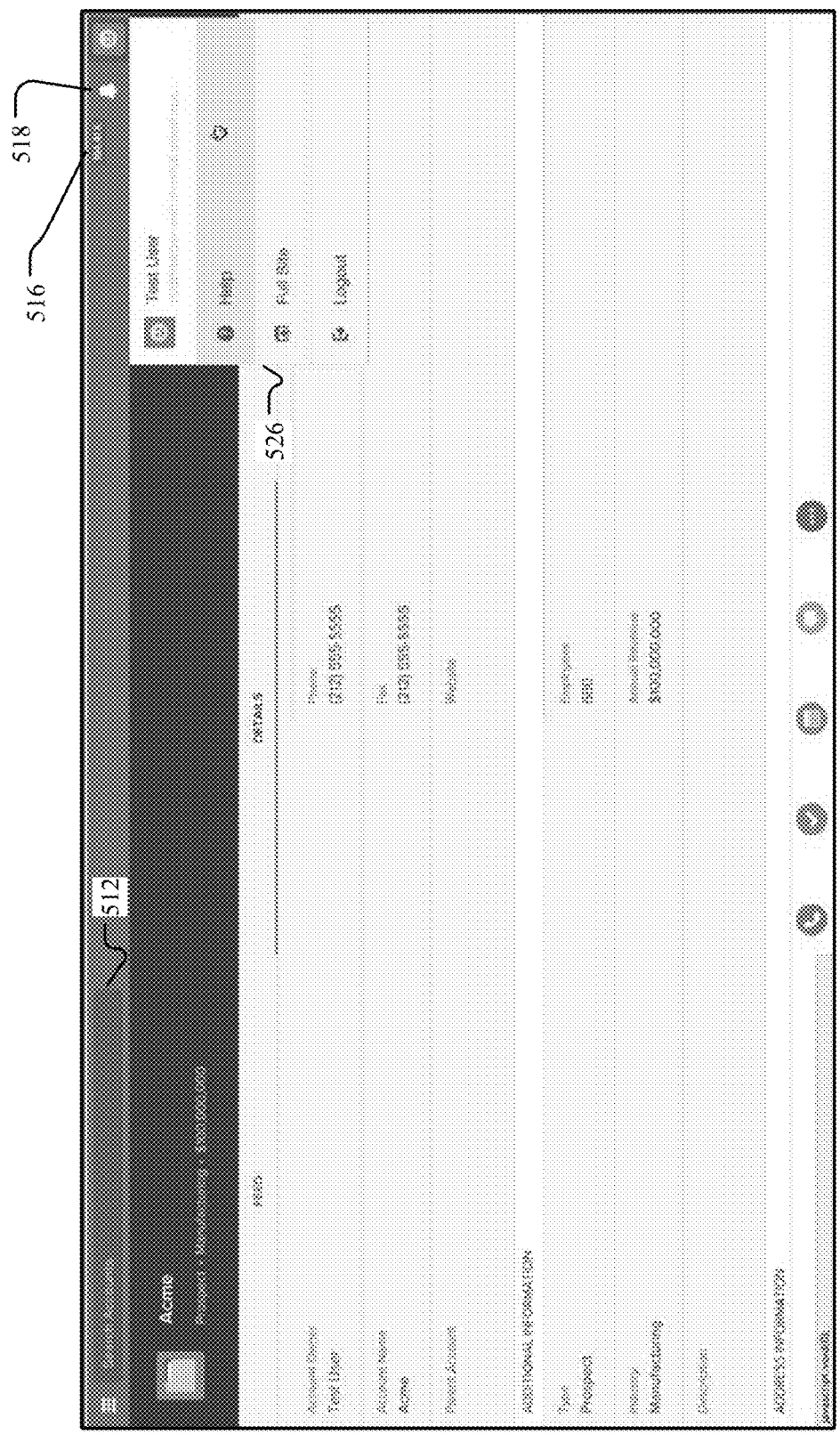
Fig. 5 Desktop User Profile Dropdown Example

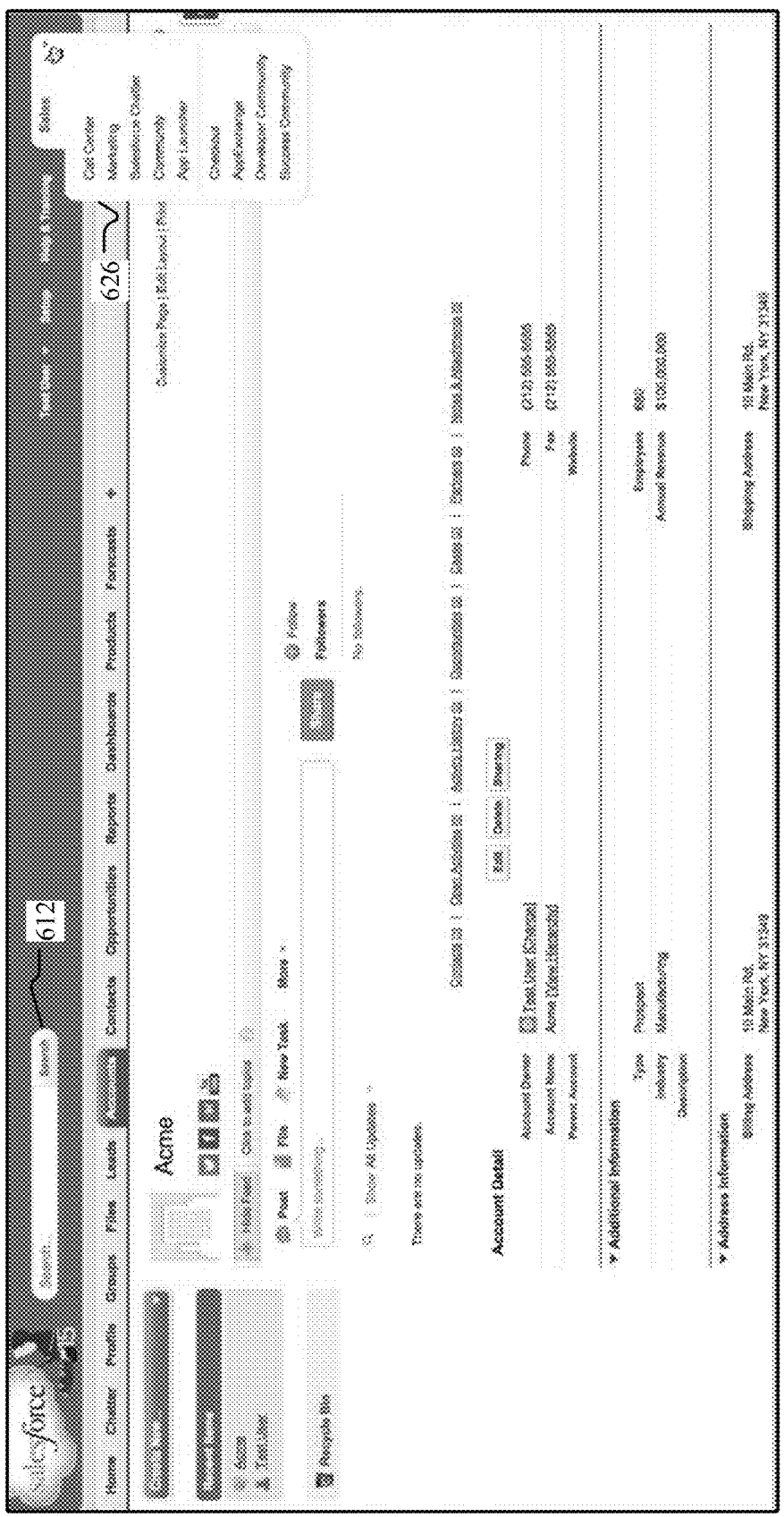
Fig. 6 Aloha UI Sales Dropdown Example

Fig. 7A Mobile UI Example
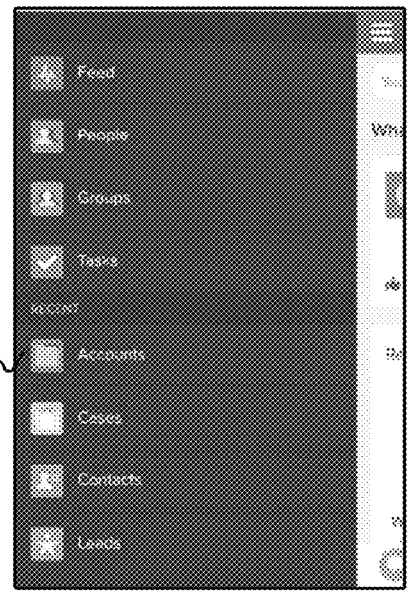
Fig. 7B Mobile Left Navigation Menu
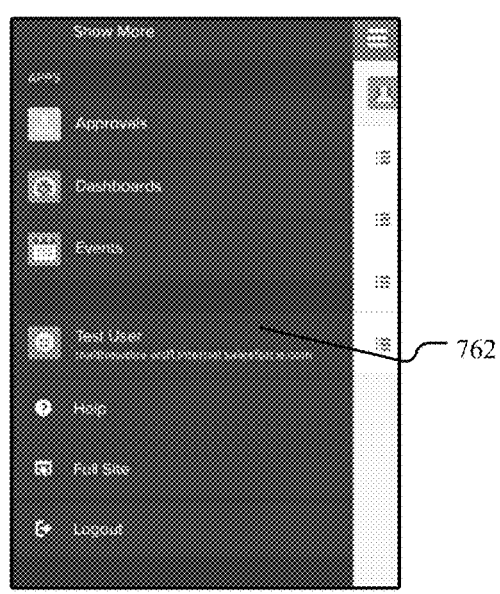
Fig. 7C Mobile UI User Profile Access
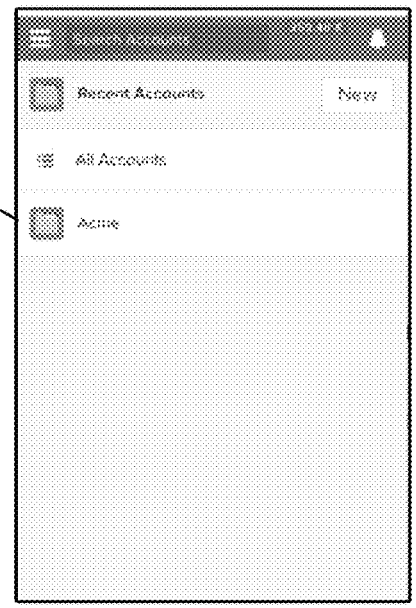
Fig. 7D Mobile UI Account Selection

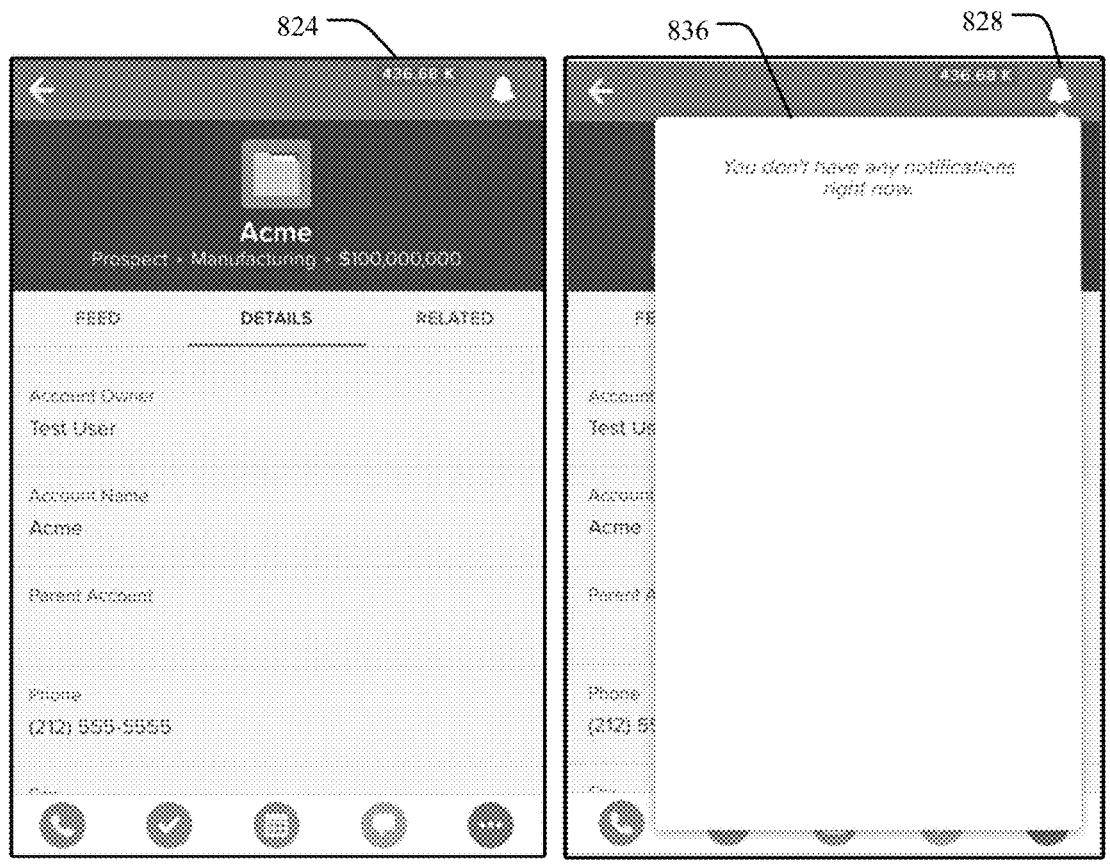
Fig. 8A Mobile UI Account Details    Fig. 8B Mobile Notifications UI

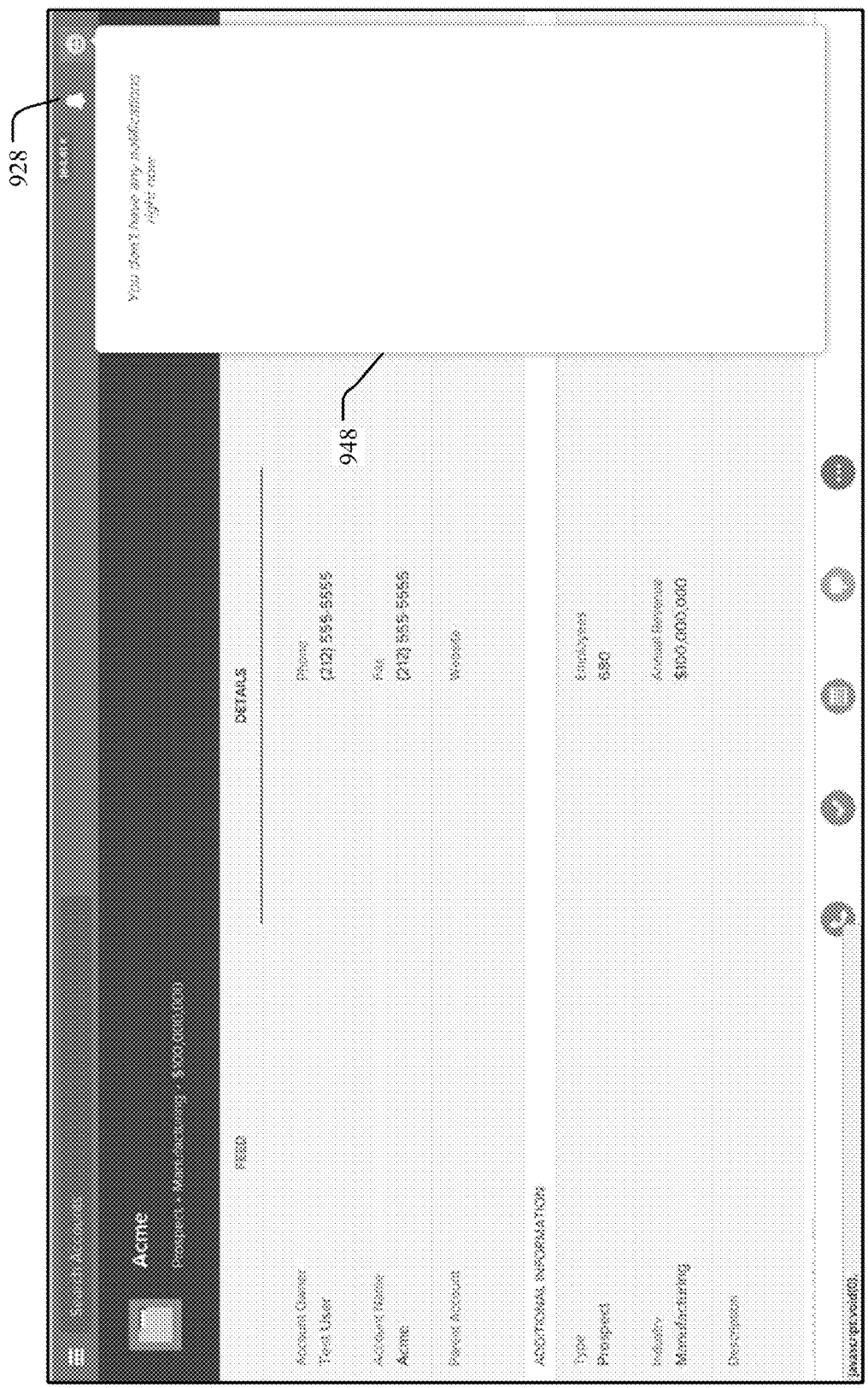
Fig. 9 Desktop Notifications UI

HeaderProvider.java ─╱─ 1010
package ui.aura.components.one.header;

import org.auraframework.Aura;
import org.auraframework.def.*;
import org.auraframework.system.Annotations.Provider;
import org.springframework.beans.factory.annotation.Autowired;

import core.apexpages.quickfix.QuickFixException;

import ui.aura.servicecomponent.Annotations.ServiceComponentProvider;
import ui.services.utils.impl.OneHelper;

```
/**
 * Provides the correct header based on org perms/prefs and form factor.
 *
 * @author matthew.davidchuk
 * @since 192
 */
@Provider
@ServiceComponentProvider                    ─── 1034
public class HeaderProvider implements ComponentDescriptorProvider {

@Autowired
    OneHelper helper;

@Override
    public DefDescriptor<ComponentDef> provide() throws QuickFixException {
        String defDescriptorName;        ─── 1044
        if (helper.isAlohaDesktop()) {
            defDescriptorName = "force:alohaHeader";
        } else if (helper.isSalesforceDesktop()) {  ─── 1054
            defDescriptorName = "one:headerDesktop";
        } else {
            defDescriptorName = "one:headerMobile";
        } return Aura.getDefinitionService().getDefDescriptor(defDescriptorName,
ComponentDef.class);
    }

}
```

Fig. 10 HeaderProvider.java

HeaderOne.cmp ⟵ 1110
```
<aura:component extensible="true" abstract="true" description="DEPRECATED">
   <aura:attribute name="config" type="Object"></aura:attribute>
   <aura:attribute name="search" type="Aura.Component[]"></aura:attribute>
   <aura:attribute name="globalSearchLauncher" type="Aura.Component[]"   ⟵ 1124
description="placeholder for the search launcher button"></aura:attribute>
   <aura:attribute name="left" type="Aura.Component[]" description="the component tree
for the left region"/>
   <aura:attribute name="right" type="Aura.Component[]" description="the component
tree for the right region"/>
   <aura:attribute name="center" type="Aura.Component[]" description="the component
tree for the center region"/>
   <aura:handler event="one:updateHeader" action="{!c.updateHeader}"/>
   <one:headerLayout aura:id="header">
      <aura:set attribute="left">
         {!v.left}
      </aura:set>
      <aura:set attribute="body">
         {!v.search}
      </aura:set>
      <aura:set attribute="right">
         <div class="header-right">
            <auraStorage:fuelGauge storageName="actions"/>
            <one:userProfileMenu config="{!v.config}" />
            <aura:renderIf isTrue="{!v.config.showSearch}">
              {!v.globalSearchLauncher}
            </aura:renderIf>
            <one:notificationsCounter />
         </div>
      </aura:set>
   </one:headerLayout>
</aura:component>
```
HeaderOneController.js ⟵ 1144
```
({
      // Hides the rhs components when the user interacts with the search input.
      // TODO move updates to header components out of header and into the
components themselves
      updateHeader: function (component, event, helper) {
      var searchHasFocus = event.getParams().searchHasFocus;
      var concreteComponent = component.getConcreteComponent();
      if (searchHasFocus) {
         $A.util.addClass(concreteComponent.getElement(), 'searchHasFocus');
      } else {
         $A.util.removeClass(concreteComponent.getElement(), 'searchHasFocus');
      }
   }
})
```

Fig. 11 Header One Component and JS Files header.cmp

```
<aura:component
implements="force:layoutRegionTop"                                    ⟵ 1222
provider="serviceComponent://ui.aura.components.one.header.HeaderProvider"   ⟵ 1244
description="Abstract app header for S1">
<!--DEPRECATED ATTRIBUTES, also the HeaderProvider needs to be removed.-->
<aura:attribute name="config" type="Object" required="false" description="DEPRECATED"/>
<aura:attribute name="entityId" type="String" description="DEPRECATED The ID of the current entity"/>

<aura:if isTrue="{!v.left != null}">
    <div aura:id="left" class="left">
        {!v.left}
    </div>
</aura:if>
<aura:if isTrue="{!v.right != null}">
    <div aura:id="right" class="right">
        {!v.right}
    </div>
</aura:if>
<aura:if isTrue="{!v.center != null}">
    <div aura:id="center" class="center">
        {!v.center}
    </div>
</aura:if>
</aura:component>
```

Fig. 12 Header Component Example Code

HeaderDesktop.cmp ⟋ 1310
<aura:component description="DEPRECATED" extends="one:headerOne"> ⟋ 1328
  <aura:attribute name="mruListViews" type="List" ></aura:attribute>
  <aura:attribute name="mruItems" type="List"></aura:attribute>

<aura:attribute name="left" type="Aura.Component[]" description="the component tree for the left region"/>
  <aura:attribute name="right" type="Aura.Component[]" description="the component tree for the right region"/>
  <aura:attribute name="center" type="Aura.Component[]" description="the component tree for the center region"/>

<aura:set attribute="left">
    <one:appNavMenu config="{!v.config}"/>
  </aura:set>
  <aura:set attribute="userProfileMenu">
    <!-- TODO don't pass config -->
    <one:userProfileMenu config="{!v.config}"/>
  </aura:set>
  <aura:set attribute="search">
    <!-- TODO don't pass config -->
    <one:headerSearchMenu config="{!v.config}"/>
  </aura:set>
</aura:component>

HeaderMobile.cmp ⟋ 1344
<aura:component extends="one:headerOne" description="DEPRECATED">
  <aura:attribute name="left" type="Aura.Component[]" description="the component tree for the left region"/>
  <aura:attribute name="right" type="Aura.Component[]" description="the component tree for the right region"/>
  <aura:attribute name="center" type="Aura.Component[]" description="the component tree for the center region"/>
  <aura:set attribute="left"> ⟋ 1364
    <one:appNavButtons/>
  </aura:set>
  <aura:set attribute="search">
    <!-- TODO don't pass config -->
    <one:headerSearchInput config="{!v.config}"/>
  </aura:set>
  <aura:set attribute="globalSearchLauncher">
    <one:globalSearchLauncher/>
  </aura:set>
</aura:component>

Fig. 13 Desktop and Mobile Header Component Files Extending HeaderOne oneHelper.java ⎯⎯⟋⎯ 1410

...
/**
 * If the S1 Aloha desktop should be shown.
 * True if all of the following conditions are met:
 * 1. It's a desktop browser.
 * 2. The org permission s1DesktopAllowed is enabled.
 * 3. The org preference s1DesktopEnabled is enabled.
 * 4. The org preference useS1AlohaDesktop is enabled.
 *
 * @return true if the S1 Aloha desktop should be shown.
 */                                            ⎯⟋⎯ 1432
public boolean isAlohaDesktop() {
    // If the browser is desktop, show Aloha by default. No perm needed for this.
    // If the aura container perm is enabled, show the S1 Desktop Experience
    return new Browser(Aura.getContextService().getCurrentContext().getClient().getUserAgent()).getFormFactor().equals(FormFactor.DESKTOP)
    &&      ⎯⟋⎯ 1442
    permAndPrefUtil.isOrgPermEnabled(OrgPermissionsBit.s1DesktopAllowed.getName())
    &&
    permAndPrefUtil.isOrgPrefEnabled(OrgPreferencesBit.s1DesktopEnabled.getName())
    &&
    permAndPrefUtil.isOrgPrefEnabled(OrgPreferencesBit.useS1AlohaDesktop.getName());
}       ⎯⟋⎯ 1444
...

Fig. 14 OneHelper.java Aloha Excerpt oneHelper.java excerpt for Desktop ⟋— 1510

...
/**
   * If the S1 desktop should be shown.
   * True if all of the following conditions are met:
   * 1. It's a desktop browser.
   * 2. The org permission s1DesktopAllowed is enabled.
   * 3. The org preference s1DesktopEnabled is enabled.
   * 4. The org preference useS1AlohaDesktop is disabled.
   *
   * @return true if the S1 desktop should be shown.
   */
  public boolean isSalesforceDesktop() { ⟋— 1544
    return new
Browser(Aura.getContextService().getCurrentContext().getClient().getUserAgent()).getFormFactor().equals(FormFactor.DESKTOP) &&
⟋— 1554
permAndPrefUtil.isOrgPermEnabled(OrgPermissionsBit.s1DesktopAllowed.getName())
&& permAndPrefUtil.isOrgPrefEnabled(OrgPreferencesBit.s1DesktopEnabled.getName())
&&
⟋— 1562
!permAndPrefUtil.isOrgPrefEnabled(OrgPreferencesBit.useS1AlohaDesktop.getName())
;
  }

Fig. 15 OneHelper.java Desktop Excerpt appLayoutContainer.cmp ⟋ 1610

```
<aura:component
model="serviceComponent://ui.aura.components.one.stageLeft.StageLeftModel"
description="This is the application layout container component for one.app, this resides
as the root component in the application.">
<!-- reusing StageLeftModel above to get at m.isDesktop -->
<!-- some day -->
<!--provider="serviceComponent://ui.aura.components.force.layout.LayoutProvider"-->
<aura:import library="one:stageLeftState" property="StageLeft"/>
<aura:attribute name="left" type="Aura.Component[]" description="the component tree
for the left region of the layout"/>
<aura:attribute name="top" type="Aura.Component[]" description="the component tree
for the top region of the layout"/>
<aura:attribute name="right" type="Aura.Component[]" description="the component tree
for the right region of the layout"/>
<aura:attribute name="center" type="Aura.Component[]" description="the component
tree for the center region of the layout"/>
<aura:attribute name="bottom" type="Aura.Component[]" description="the component
tree for the bottom region of the layout"/>
<aura:attribute name="hidden" type="Aura.Component[]" description="the component
tree for the hidden region of the layout"/>
<aura:handler event="one:toggleNav" action="{!c.toggleNav}"/>
<aura:handler event="one:toggleHeader" action="{!c.toggleHeader}"/>
<aura:handler event="one:actionCardHovered" action="{!c.onActionCardHovered}"/>
<aura:handler event="one:actionCardUnhovered" action="{!c.onActionCardUnhovered}"/
>
<aura:attribute name="isSalesforceDesktop" type="Boolean" description=""/>
<div class="container" aura:id="container">                   ⟋ 1644
...
<one:header>                    ⟋ 1664
<aura:set attribute="left">
<aura:if isTrue="{! v.isSalesforceDesktop }">
<aura:set attribute="else">
<one:appNavToggle/>
<one:appNavBackButton/>
</aura:set>
</aura:if>
</aura:set>
<aura:set attribute="center">
<aura:if isTrue="{!m.useDesktopSearch}">
<one:searchInputWithTypeAhead/>
<aura:set attribute="else">
<one:headerSearchInput/>
</aura:set>
</aura:if>
</aura:set>
```

Fig. 16 appLayoutContainer.cmp - part 1

```
appLayoutContainer.cmp  ──⌐ 1610
<aura:set attribute="right">
<auraStorage:fuelGauge storageName="actions"/>
<aura:if isTrue="{!!m.useDesktopSearch}">
<one:globalSearchLauncher/>                 ──── 1734
</aura:if>
<one:notificationsCounter/> ──────── 1744
<aura:if isTrue="{! v.isSalesforceDesktop }">
<one:userProfileCardTrigger/>
</aura:if>
</aura:set>
</one:header>
<one:centerStage aura:id="centerStage" host="web">
<aura:set attribute="toast"><one:toast /></aura:set>
<aura:set attribute="actionBar">
<one:actionBar aura:id="actionBar" desktop="{! m.isSalesforceDesktop }" />
</aura:set>
</one:centerStage>
<aura:if isTrue="{!!v.isSalesforceDesktop}">
<a class="curtains" aura:id="curtains" onclick="{!c.toggleNav}"
title="{!$Label.StageLeft.HideNavigation}">
<span class="assistiveText">{!$Label.StageLeft.HideNavigation}</span>
</a>
</aura:if>
</section>
</div>

...

<one:panelManager/>
<force:modalSpinner/>
<one:notificationsTray/>
</div>                         ──⌐ 1764

...
```

Fig. 17 appLayoutContainer.cmp - part 2 of 2

AlohaHeader.cmp ⟵ 1810

```
<aura:component description="The aloha replicate header" model="java://
ui.aura.components.force.aloha.alohaHeader.AlohaHeaderModel" >
   <aura:attribute name="entityId" type="String" description="The ID of the current entity"/>

<aura:handler name="init" value="{!this}" action="{!c.init}"/>

<header role="banner">
      <div class="masthead" aura:id="masthead">
        <div class="logo">
              <ui:image src="{!m.logo.url}" alt="{!m.logo.alt}" aura:id="logoImg"/>
        </div>
        <div class="global">
              <force:alohaGlobalNavigationBar />
        </div>
      </div>
      <div class='tabset'>
         <force:alohaTabSet aura:id="tabset"
            tabs="{!m.tabs}"
            showTabs="{!m.showTabs}"
                    allTabsTab="{!m.allTabsTab}"
                    activeTabKey="{!m.activeTabKey}"
         />
      </div>
   </header>
</aura:component>
```

AlohaHeaderController.js ⟵ 1844

```
({
        init: function(component, event, helper) {
              $A.util.on(window, "message", helper.onPostMessage.bind(helper, component));
        }
})
``` alohaHeaderHelper.js

Fig. 18 Aloha Desktop - part 1 of 2

```
alohaHeaderHelper.js              ⌐ 1910
({
    /** Calculates how much space the tabSet can take up. */
    calculateAvailableWidth: function(component) {
        "use strict";
        return component.find("tabset").getElement().offsetWidth;
    }, /**
     * Subscribed in the init controller method.
     * Listens for postMessages from the subframe to resize and reposition
     * the header based on the width and scroll position of the sub frame.
     *
     * These events are being sent from the file navigate.js
     */
    onPostMessage: function(component, event) {
        var jobj = null;
        try {
            jobj = JSON.parse(event.data);
            console.log(jobj);
        } catch (e) { return; } var element = component.getElement();

if('viewportWidth' in jobj) {
            element.style.width = jobj.viewportWidth + "px";
            element.style.boxSizing="";
        }
        if('scrollTop' in jobj) {
            element.style.top = -1*jobj.scrollTop + "px";
        }
    }
})
alohaHeaderRenderer.js        ⁄⁀ 1964
({
        afterRender: function(component, helper) {
            this.superAfterRender();

var logoDiv = component.find("logoImg").getElement();
                logoDiv.setAttribute("width", component.get("m.logo.width"));
                logoDiv.setAttribute("height", component.get("m.logo.height"));
        }
})
```

Fig. 19 Aloha Desktop – part 2 of 2

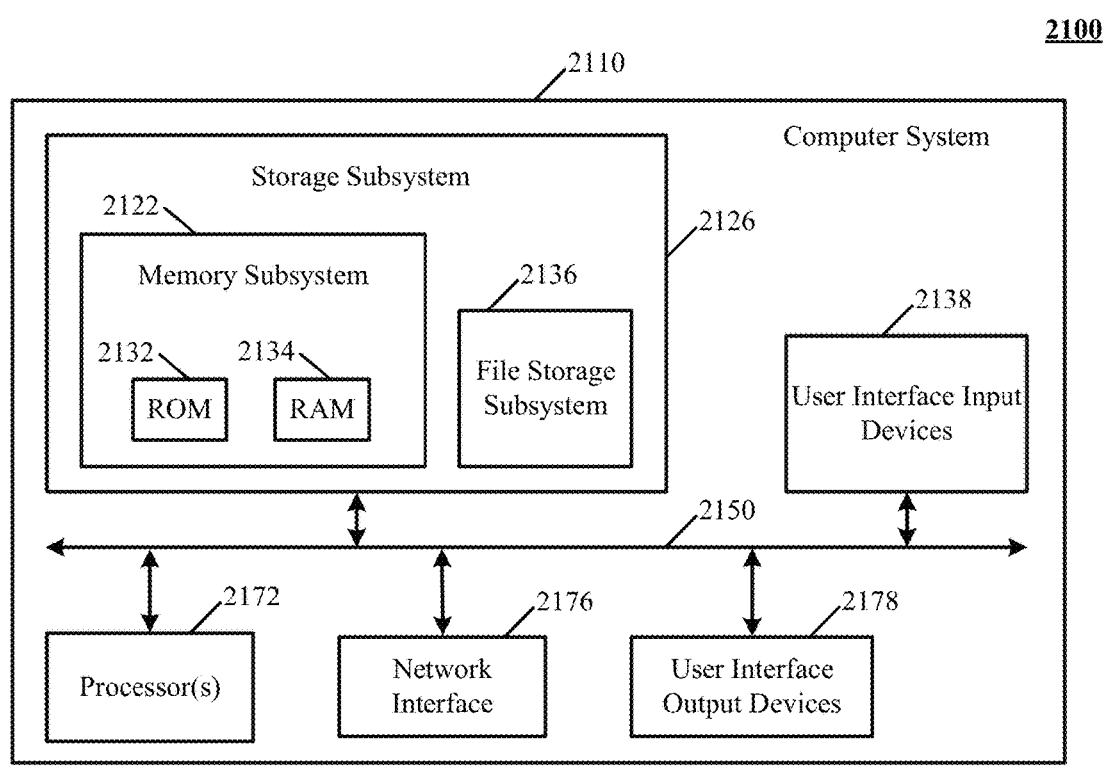
FIG. 21 Computer System

SYSTEMS AND METHODS OF OPTIMIZING DELIVERY OF FORM FACTOR SPECIFIC CONTENT

INTRODUCTION

The technology disclosed describes systems and methods for optimizing delivery of form factor specific content for users in different environments, such as desktop computer browsers and mobile device applications. The technology further discloses systems and methods for providing support for developers whose goal is to render specific implementations of a user interface to deliver distinct user interface experiences.

BRIEF DESCRIPTION OF THE DRAWINGS

The included drawings are for illustrative purposes and serve only to provide examples of possible structures and process operations for one or more implementations of this disclosure. These drawings in no way limit any changes in form and detail that may be made by one skilled in the art without departing from the spirit and scope of this disclosure. A more complete understanding of the subject matter may be derived by referring to the detailed description and claims when considered in conjunction with the following figures, wherein like reference numbers refer to similar elements throughout the figures.

FIG. 3 shows an example of a desktop user interface.

FIG. 4 shows an example of a legacy desktop user interface supported by the same base platform.

FIG. 5 shows an example desktop user interface for a specific account feature, for an account labeled Acme.

FIG. 6 shows an example of the legacy Aloha header user interface for the ACME account.

FIG. 7A shows a mobile user interface example, with the hamburger icon.

FIG. 7B shows a left navigation menu of a mobile user interface.

FIG. 7C shows user profile features in the lower portion of stage left of the device screen.

FIG. 7D is an example display of recent accounts on a mobile user interface.

FIG. 8A shows account details for the Acme account in a mobile format.

FIG. 8B shows a notifications tray for a mobile device user interface.

FIG. 9 shows a notification tray for a desktop user interface.

FIG. 10 is an example of code to implement header provider functionality.

FIG. 11 is an example of code to implement base header component.

FIG. 12 is an example of code to implement header component for a desktop user interface.

FIG. 13 is an example of code to implement components for headers for a desktop and for a mobile device user interface.

FIG. 14 is an example of code to implement a form factor customization decision for a legacy header.

FIG. 15 is an example of code to implement a form factor decision for a 'new look and feel' header.

FIG. 16 is an example of a code excerpt to implement an application layout container that includes a customizable header.

FIG. 17 is an example of another code excerpt to implement an application layout container that includes a notifications tray.

FIG. 18 is a code excerpt for implementing a legacy header for a user interface.

FIG. 19 is an example of another excerpt of code to implement a legacy header for a user interface.

FIG. 21 an example computer system used for a customization environment.

DETAILED DESCRIPTION

Figure 1:
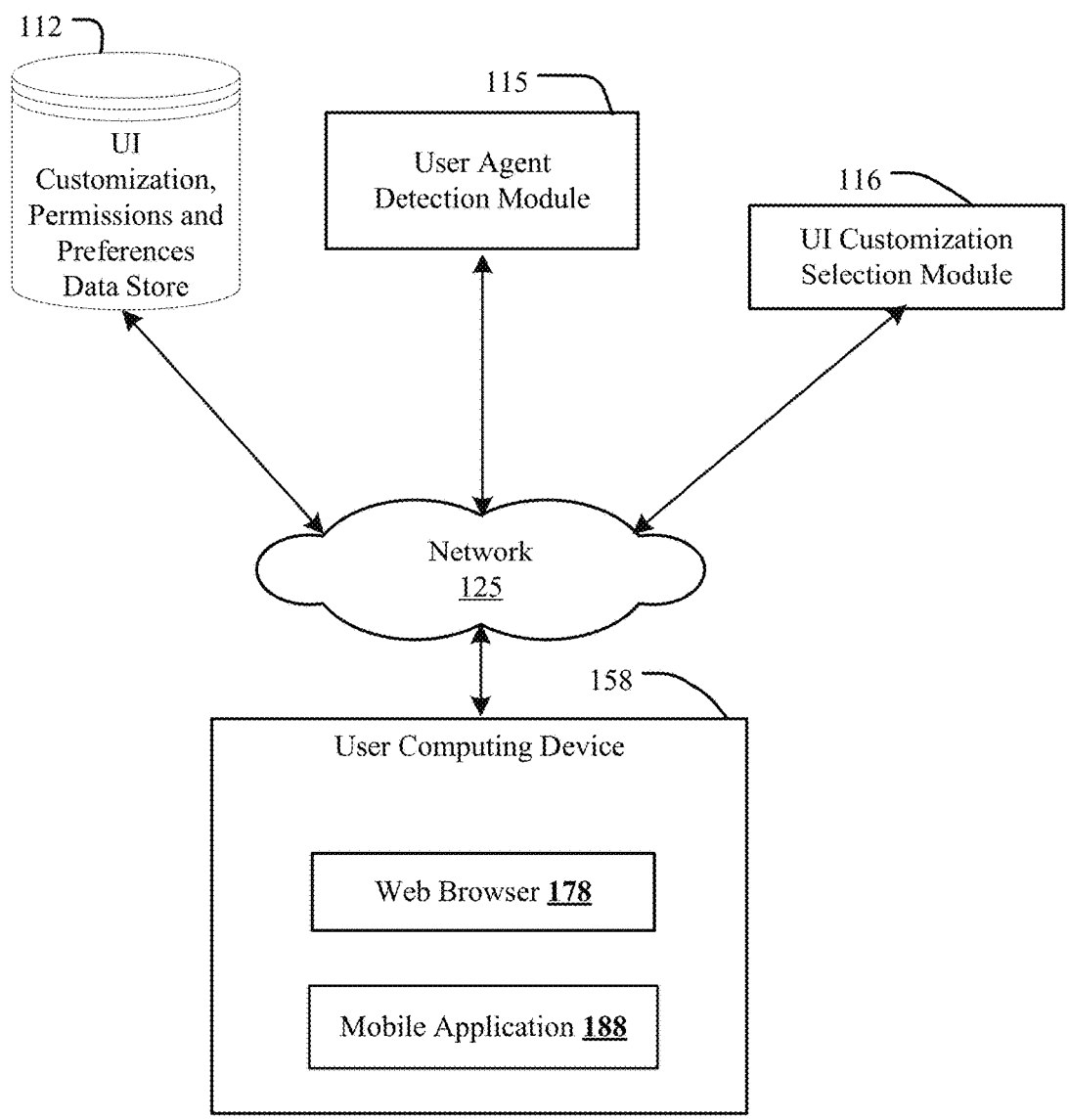
FIG. 1 illustrates one implementation of an optimization environment for delivery of form factor specific content.

The following detailed description is made with reference to the figures. Sample implementations are described to illustrate the technology disclosed, not to limit its scope, which is defined by the claims. Those of ordinary skill in the art will recognize a variety of equivalent variations on the description that follows.

Web applications are typically designed to be adaptive, which implies that different content and presentation are utilized for mobile form factors than for desktop form factors. For example, a form might appear with 2 columns when viewed on a desktop browser and with only one column when viewed on a mobile device. When a server detects a device, a corresponding form factor that corresponds to the device type is an integral part of the design process for a user experience.

The design process includes the customization of content and metadata on the server; delivery of the content and metadata from the server to a client, and rendering and presentation of the content and metadata on the client application or web browser.

Multiple methods exist for client side detection of a device and an associated form factor. The client can re-perform detection based on the user agent http header, or depend on information provided by the server based on a user agent http header that specifies the device and an associated form factor. As another alternative; CSS media queries can be used to detect the size of the device display and then CSS can be conditionally applied to deliver the desired look and feel.

To detect a device and an associated form factor on the server side, user agent http headers can be used. If device and form factor detection is performed on the server, then the content and metadata to be transferred to the client can be minimized so that only information appropriate for the identified device and form factor gets delivered from the server to the client.

If device and form factor detection is deferred to the client side, then content and metadata for all form factors and devices would be delivered from the server to the client, since the correct content and metadata is only determined at the last instant by the client.

The technology disclosed relates to optimizing delivery of form factor specific content, thereby saving bandwidth and load time.

The technology disclosed can be implemented in the context of any computer-implemented system including a database system, a multi-tenant environment, or the like. Moreover, this technology can be implemented using two or more separate and distinct computer-implemented systems that cooperate and communicate with one another. This technology can be implemented in numerous ways, including as a process, a method, an apparatus, a system, a device, a computer readable medium such as a computer readable storage medium that stores computer readable instructions or computer program code, or as a computer program product comprising a computer usable medium having a computer readable program code embodied therein.

As used herein, the "identification" of an item of information does not necessarily require the direct specification of that item of information. Information can be "identified" in a field by simply referring to the actual information through one or more layers of indirection, or by identifying one or more items of different information which are together sufficient to determine the actual item of information. In addition, the term "specify" is used herein to mean the same as "identify."

The technology disclosed includes providing support for developers who design user interface environments to optimize content delivery with minimal use of resources to provide the same user experience for users in different environments that is, for users on desktop and laptop computers, and users on mobile devices, such as iPads and iPhones, etc. The disclosed technology additionally provides systems and methods for rendering specific implementations of a user interface for consumption by customers who work for specific businesses or organizations.

While the technology disclosed is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

Customization Environment

FIG. 1 illustrates one implementation of an optimization environment 100. FIG. 1 shows that environment 100 can include customizations, permissions and preferences data store 112, user agent detection module 115, a UI customization selection module 116, and a network 125. Optimization environment 100 further includes a user computing device 158 with a web browser 178 and a mobile application 188. In other implementations, environment 100 may not have the same elements as those listed above and/or may have other/different elements instead of, or in addition to, those listed above.

The customizations, permissions and preferences data store 112 can include customization data for controlling the placement and behavior of search features and user profiles. Customization data includes placement and behavior of primary menued features such as groups, accounts, opportunities, reports, products, dashboards and other features that describe the look and feel of a user interface. Customizations can also include placement and behavior of notification features, and placement and behavior of performance fuel gauges available in a developer mode. Example of gauges available in a developer mode include a memory consumption monitor that displays memory usage, a performance fuel gauge that indicates battery drain, and a performance fuel gauge that indicates bandwidth usage. Additional performance display elements can include profiling measurements such as CPU usage.

The customizations, permissions and preferences data store 112 includes permission data that can include specifications of which users and organizations are granted access to distinct user interface form factors, and to specific features within a user interface. In some implementations, more features are displayed in a user interface based on permissions data, such as "manager" status. In another example, in some implementations, permissions can include permission for some users to read and write to a file, while other users or organizations can only read the file.

The customizations, permissions and preferences data store 112 includes preference data that signals which feature combinations are to be delivered for an individual user interface form factor. Preferences can specify details such as color schemes, placement and behavior of menued features, and organization-specific logos.

Customizations, permissions and preferences data store 112 includes different data types such as free-form text, structured text, and/or unstructured text. In some implementations, customizations, permissions and preferences data store 112 can include web page content such as blog posts, as well as videos and music.

The user agent detection module 115 detects a user agent string from a user computing device 158. The user agent string can contain device-specific data that partially specifies which user interface form factor matches the device through which the user is accessing a system. In some implementations, data accessed by the user agent detection module 115 can be used by a web server to choose variants based on the known capabilities of a particular version of client software. The user agent detection module 115 can detect data for a specific browser, including but not limited to Chrome, Safari, Opera, Internet Explorer, and Firefox.

The UI customization selection module 116 can include templates for organizing information accessible in the customizations, permissions and preferences data store 112, in addition to data accessed by the user agent detection module 115. The UI customization module 116 selects a customizable user interface to deliver to support a specific user, organization and user device.

In some implementations, the modules of customization environment 100 can be of varying types including workstations, servers, computing clusters, blade servers, server farms, or any other data processing systems or computing devices. Modules can be communicably coupled to the data store via a different network connection. For example, user agent detection module 115 can be coupled via the network 125 (e.g., the Internet) and UI customization selection module 116 can be coupled to a direct network link. In some implementations, UI customization selection module 116 may be connected via a WiFi hotspot.

In some implementations, network(s) 125 can be any one or any combination of Local Area Network (LAN), Wide Area Network (WAN), WiFi, WiMAX, telephone network, wireless network, point-to-point network, star network, token ring network, hub network, peer-to-peer connections like Bluetooth, Near Field Communication (NFC), Z-Wave, ZigBee, or other appropriate configuration of data networks, including the Internet.

User computing device 158 includes a web browser 178 and/or a mobile application 188. In some implementations, user computing device 158 can be a personal computer, laptop computer, tablet computer, smartphone, personal digital assistant (PDA), digital image capture devices, and the like.

In some implementations, datastores can store information from one or more tenants into tables of a common database image to form an on-demand database service (ODDS), which can be implemented in many ways, such as a multi-tenant database system (MTDS). A database image can include one or more database objects. In other implementations, the databases can be relational database management systems (RDBMSs), object oriented database management systems (OODBMSs), distributed file systems (DFS), no-schema database, or any other data storing systems or computing devices.

User Interfaces

Many users of user interfaces develop a familiarity with features—with the location of a feature in a dropdown menu, or an icon located on the left or right side of their screen. Some users embrace change, while others may experience negative reactions to a user interface that looks substantially different than the one to which they have become accustomed. Developers can find it valuable to provide the option to deliver both a legacy user interface and a new look and feel user interface for a platform, to avoid frustrating some local customers. Even if the underlying base platform that supports both user interfaces is identical, developers can update the look and feel of their platform's user environment and can introduce new exciting features for new users and for the adventurous, while preserving an existing familiar user environment for longtime users.

Figure 2:
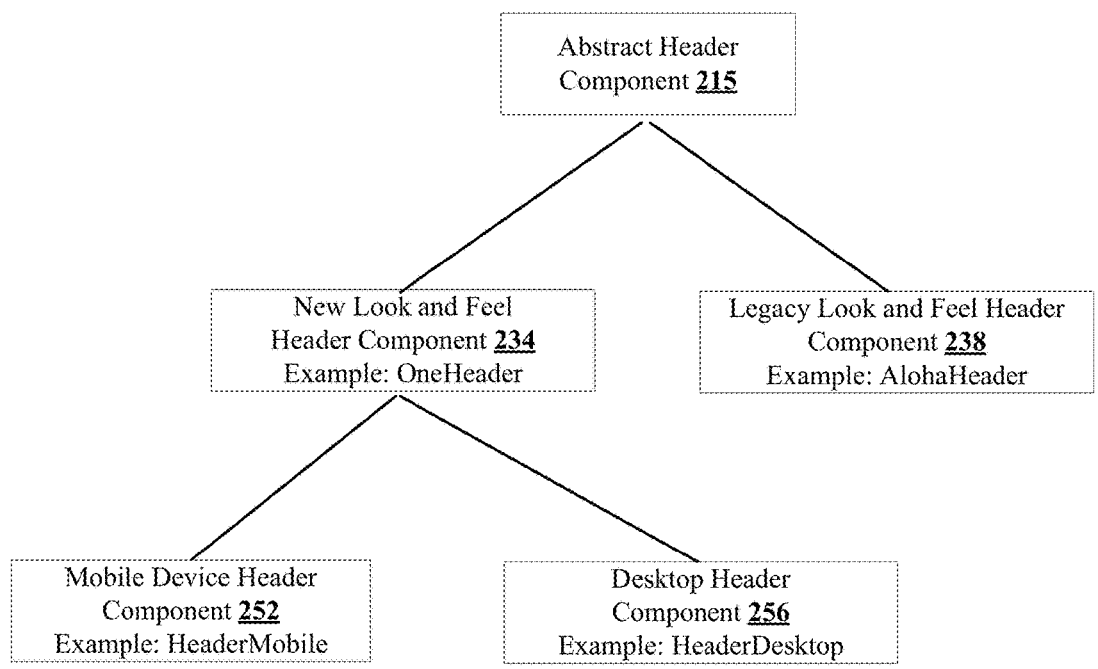
FIG. 2 shows an example component structure that can be used to implement object oriented inheritance.

FIG. 2 shows an example structure that can be used to facilitate delivery of multiple customizable user interfaces for specific devices, user permissions and user preferences. An abstract header component 215 includes a base platform capable of delivering multiple form factor-specific user interfaces. For new look and feel header component 234, the disclosed technology is described below using OneHeader as the header component. For legacy look and feel header component 238, we use an example AlohaHeader component. Both of these header components are supported by the abstract header component 215 platform.

For the new look and feel header component 234, two distinct user interface configurations are for a desktop, using a browser, and for a mobile device using a mobile application. We describe a mobile device header component 252, specifically designed for a mobile device form factor, using MobileHeader component. Further, we describe a desktop header component 256 using example DesktopHeader component. Both of these user interfaces configurations use the new look and feel header component 234, with OneHeader as the base header component.

FIG. 3 shows an example of a new look and feel desktop user interface, with search 322 and top right navigation 326. By contrast, FIG. 4 shows an example of a legacy desktop user interface supported by the same base platform. The differences between the two user interfaces can be subtle for some features and more obvious for other features. Note the difference between search 322 and legacy search 422. The right navigation 326 and contrasting legacy right navigation 426 also show user interface customizations.

FIG. 5 shows an example new look and feel desktop user interface for a specific account feature, for an account labeled Acme. Search accounts 512, and the right navigation dropdown 526 with user profile information, are features of the new look and feel desktop form factor. FIG. 6 shows an example of the legacy Aloha header user interface for the same feature the ACME account. Aloha search 612 is noticeably different from search accounts 512. Also, instead of the user profile customization that is delivered in the new look and feel desktop UI, the Aloha header interface includes a Sales dropdown 626, with sales-related features.

Features can be selectively delivered for users of a platform. For example, application developers are interested in memory consumption for new features. An example of a feature introduced with the new look and feel desktop UI user interface is a performance fuel gauge available in developer mode. That is, users who have permission to develop applications and who set their preferences to view a memory consumption monitor can see a fuel gauge of memory consumed 516 in FIG. 5.

FIG. 7A shows a mobile UI example, with the hamburger icon 712 three bars in the top left corner of the mobile device screen. Selection of the hamburger icon 712 selects the left navigation menu 736 of the mobile UI in FIG. 7B for display. The mobile application left navigation includes the same features, such as accounts and contacts, traditionally displayed across a row of tabs in the legacy Aloha desktop user interface. In FIG. 7C, user profile 762 features are presented in the lower portion of stage left of the device screen. The resultant screen displayed after selection of the accounts feature in the mobile left navigation menu 736 is shown in FIG. 7D as recent accounts, and includes the Acme account 756.

FIG. 8A shows account details for the Acme account in a mobile format a distinct form factor with a customized user interface. As described earlier, developers can introduce new exciting features at the same time that they make changes to a user interface. The example feature introduced with the new look and feel desktop UI user interface is the performance fuel gauge available in developer mode, described earlier. Mobile users who have permission to develop applications and who set their preferences to view a memory consumption monitor can see a fuel gauge of memory consumed 824 in FIG. 8A.

Another feature made popular by social networks is notifications. Both the new look and feel user desktop interface and mobile user interface inherit their feature options from the base header component. On the mobile device user interface, notifications can be accessed by selecting the bell 828 in FIG. 8B. A notification tray 836 displays any messages. Similarly, for the new look and feel desktop user interface, notifications are accessible by selecting the bell 928 in FIG. 9. A notification tray 948 displays any notification messages.

Implementation Example

In the example described above, deliverable customizations include a legacy Aloha desktop user interface, a new look and feel desktop UI and a mobile user interface. An abstract one:header component determines which concrete components to utilize at run time. Common code combines with deliverable customizations with injected header information dependent on the selected deliverable customization and controls placement and behavior of a search feature, of user profile features, and of primary menued features implemented by the common code.

HeaderProvider.java 1010, in FIG. 10, includes an isAlohaDesktop call 1044 and an isSalesforceDesktop call 1054 to determine which of three headers to use: force:alohaHeader, one:headerDesktop, or one:headerMobile.

Header component 215 includes a base platform capable of delivering multiple form factor-specific user interfaces. For new look and feel header component 234, the disclosed technology uses an abstract component that provides base code for both the desktop and mobile headers a component file HeaderOne.cmp 1110 and javascript file HeaderOneController.js 1144, in FIG. 11. .HeaderOneController.js 1144 controls behavior and placement of the search feature. For example, the controller hides right hand side components when the user interacts with the search input.

Header.cmp 1222 in FIG. 12 includes provider 1244 for injecting inheritance from the base platform header to customizations of the base header.

For the new look and feel header component 234, one user interface configuration is for a desktop using a browser. Desktop header component 256 is implemented using HeaderDesktop component 1310, in FIG. 13 to extend one:headerOne 1110, and setting up the component tree for each of the three user interface regions: left, right and center, of the desktop screen. HeaderDesktop component 1310 includes an attribute for the search feature.

A user interface configuration for mobile device header component 252, specifically designed for the mobile device form factor, uses HeaderMobile component 1344, which extends headerOne, including setting up attributes for the navigation buttons 1364. The HeaderMobile component 1344 inherits and configures attributes from one:headerOne 1110, including an attribute for the search feature.

The legacy desktop customizable user interface is implemented using different components. A customizable user interface for legacy look and feel header component 238 is configured using AlohaHeader.cmp 1810 in FIG. 18 to implement the header component, with support from AlohaHeaderController.js 1844. AlohaHeaderHelper.js 1910 in FIG. 19 includes functions that customize the legacy aloha user interface, including calculating space for tab settings. AlohaHeaderRenderer.js 1964 in FIG. 19 handles additional specifics for the legacy interface, including logo display details.

Selecting among available deliverable customizations of a user interface deliverable in response to the user interface request, the selection is based at least in part on the form factor identification in the user agent string and user ID, and sometimes also based in part on an organization identifier. For this example implementation, the default deliverable customization selected for a desktop user interface is the legacy interface, alohaDesktop. The default choice can be overridden by enabling the permission for use of the new look and feel desktop.

isAlohaDesktop function 1432, in the OneHelper.java excerpt for aloha 1410 in FIG. 14, accesses the current context, form factor, client, and user agent from a user interface request. The function considers whether the legacy desktop is to be displayed by considering whether the following conditions are met: the user device is a desktop browser, the user's org permission enables the aloha UI and the desktop 1444, and the user has enabled the legacy desktop in their preferences. When these conditions are met, the form factor for the legacy desktop 1442 is delivered.

IsSalesforceDesktop function 1544 in the OneHelper.java excerpt for desktop 1510 in FIG. 15 accesses the current context, form factor, client, and user agent from a user interface request. The function considers whether the new look and feel desktop is to be displayed by considering whether the following conditions are met: the user device is a desktop browser, the user's org permission allows the new look and feel, the user has enabled the new look, and the user has disabled the legacy desktop in their preferences. When these conditions are met, the form factor for the new look and feel desktop 1554 is delivered.

Common code combines with the deliverable desktop customizations, with injected header information that controls the placement and behavior of a search feature implemented by the common code in HeaderOne.cmp 1110 via search attributes 1124, described above. The placement and behavior of menued features is customizable based on the header selected, also.

An application layout container includes the header as part of the customizable user interface. In the example implementation described, the customized user interface header is included via a call to the one:header function 1664 in the layout container component AppLayoutContainer.cmp 1610 in FIG. 16 and FIG. 17. Attributes set customizable headers via isSaleforceDesktop 1644.

For the example implementation, three distinct customizable user interfaces can be delivered, dependent on the desired implementation. Permissions and preferences for an organization and user, based at least in part on the user ID and an organization ID associated with the user ID, are used to limit the options available for selection as available deliverable customizations. In each case, by limiting code delivery to the selected deliverable customization, bandwidth used and load time are reduced.

The customized user interface delivered for a user request includes the minimal set of component instances needed to render the experience requested by the user. Legacy aloha desktop user requests are separate from the new look and feel headers for desktop and mobile, and the json file for the legacy UI contains no references to either one:headerDesktop or one:headerMobile classes that are used to customize the 'new look and feel' desktop. The user interface delivered for new look and feel desktop user requests includes references to one:headerDesktop, but contains no references to force.alohaHeader or one:headerMobile. For the mobile customized user interface, the delivered user interface contains references to one:headerMobile and no references to either force:alohaHeader or one:headerDesktop.

Implementation Workflow

Figure 20:
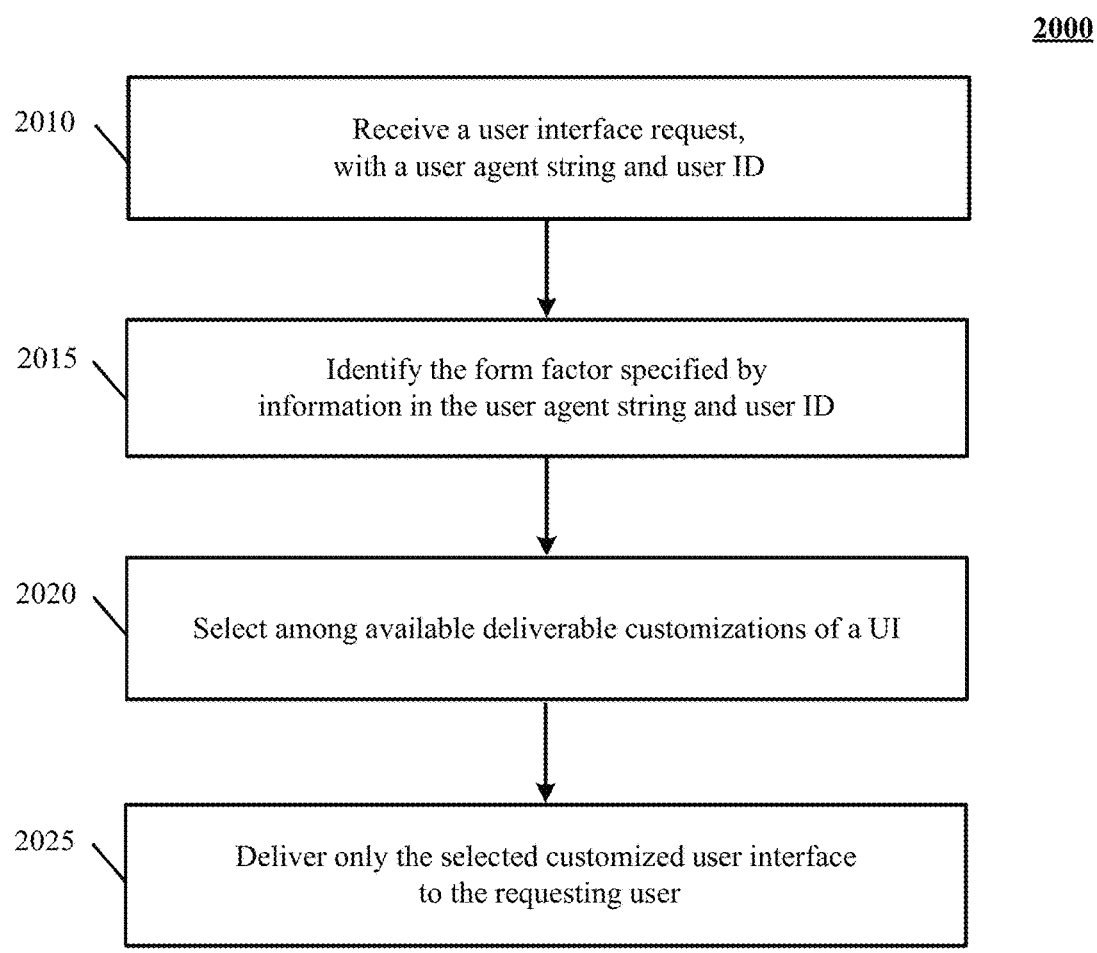
FIG. 20 is an example flow of the delivery of a form factor specific user interface.

FIG. 20 is a flowchart 2000 of one implementation of an environment for optimizing delivery of form factor specific content for users in different environments, such as desktop computer browsers and mobile device applications. Flowchart 2000 can be implemented at least partially with a database system, e.g., by one or more processors configured to receive or retrieve information, process the information, store results, and transmit the results. Other implementations may perform the actions in different orders and/or with different, fewer or additional actions than those illustrated in FIG. 20. Multiple actions can be combined in some implementations. For convenience, this flowchart is described with reference to a method.

At action 2010, receive a user interface request, and receive a user agent string with form factor identification and user ID, and possibly an organization ID.

At action 2015, identify the form factor specified by information in the user agent string and user ID, and possibly the organization ID.

At action 2020, select among available deliverable customizations of the user interface deliverable in response to the user interface request, the selection based at least in part on the form factor identification in the user agent string and user ID and possibly an organization ID.

At action 2025, deliver the customized user interface to the requesting user, including common code that implements user interface placement and behavior of a search feature, user profile features, and primary menued features implemented by the common code.

Computer System

FIG. 21 is a block diagram of an example computer system 2100. FIG. 21 is a block diagram of an example computer system, according to one implementation. The processor can be an ASIC or RISC processor. It can be an FPGA or other logic or gate array. It can include graphic processing unit (GPU) resources. Computer system 2110 typically includes at least one processor 2172 that communicates with a number of peripheral devices via bus subsystem 2150. These peripheral devices may include a storage subsystem 2126 including, for example, memory devices and a file storage subsystem, user interface input devices 2138, user interface output devices 2178, and a network interface subsystem 2176. The input and output devices allow user interaction with computer system 2110. Network interface subsystem 2176 provides an interface to outside networks, including an interface to corresponding interface devices in other computer systems.

User interface input devices 2138 may include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 2110.

User interface output devices 2178 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide a non-visual display such as audio output devices. In general, use of the term "output device" is intended to include all possible types of devices and ways to output information from computer system 2110 to the user or to another machine or computer system.

Storage subsystem 2124 stores programming and data constructs that provide the functionality of some or all of the modules and methods described herein. These software modules are generally executed by processor 2172 alone or in combination with other processors.

Memory 2122 used in the storage subsystem can include a number of memories including a main random access memory (RAM) 2134 for storage of instructions and data during program execution and a read only memory (ROM) 2132 in which fixed instructions are stored. A file storage subsystem 2136 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 336 in the storage subsystem 2126, or in other machines accessible by the processor.

Bus subsystem 2150 provides a mechanism for letting the various components and subsystems of computer system 2110 communicate with each other as intended. Although bus subsystem 2150 is shown schematically as a single bus, alternative implementations of the bus subsystem may use multiple busses.

Computer system 2110 can be of varying types including a workstation, server, computing cluster, blade server, server farm, or any other data processing system or computing device. Due to the ever-changing nature of computers and networks, the description of computer system 2110 depicted in FIG. 21 is intended only as one example. Many other configurations of computer system 2110 are possible having more or fewer components than the computer system depicted in FIG. 21.

Particular Implementations

In one implementation, a method is disclosed for delivering a customized user interface, including receiving a user interface request, receiving a user agent string with form factor identification and user ID, and optionally organization ID, and selecting among available deliverable customizations of a user interface deliverable in response to the user interface request. The selection is based at least in part on the form factor identification in the user agent string and user ID. The method includes each user interface with deliverable customization includes common code that combines with the deliverable customizations; and injected header information dependent on the selected deliverable customization. The injected header information controls user interface placement and behavior of a search feature implemented by the common code; user interface placement and behavior of user profile features implemented by the common code; and user interface placement and behavior of primary menued features implemented by the common code. The method further includes delivering the customized user interface to the requesting user.

This method and other implementations of the technology disclosed can include one or more of the following features and/or features described in connection with additional methods disclosed. In the interest of conciseness, the combinations of features disclosed in this application are not individually enumerated and are not repeated with each base set of features.

In some implementations, the method further includes accessing an organization ID based on the user ID. In yet other implementations, the method includes retrieving permissions and preferences for an organization and user, based at least in part on the user ID and an organization ID associated with the user ID; and limiting options available for selection as available deliverable customization based on the permissions and preferences.

For some implementations, the injected header information further controls user interface placement and behavior of notification features; and can further control user interface placement and behavior of at least one performance fuel gauge available in a developer mode; the performance fuel gauge can register memory usage, indicate battery drain, or indicate bandwidth usage.

For some implementations, the injected header information further includes placement and behavior of additional menued features implemented by a non-common code segment. For yet other implementations, the injected header information includes a portion of inherited header information that applies to multiple deliverable customizations; and can further include limiting code delivery to the selected deliverable customization, whereby bandwidth used and load time are reduced.

A computer implemented system applied to delivering a customized user interface, with the computer implemented system including a processor, memory coupled to the processor, and program instructions stored in the memory can implement any of the methods described above.

Yet another implementation may include a tangible computer-readable memory including computer program instructions that cause a computer to implement any of the methods described above.

While the technology disclosed is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the innovation and the scope of the following claims.

What is claimed is:

1. A method of delivering a customized user interface, the method including:
   receiving a user interface request at a server;
   receiving a user agent string with a form factor identification and a user ID;
   determining an organization ID based at least in part on receiving the user agent string with the form factor identification and the user ID, wherein the organization ID is associated with a subset of available deliverable customizations of a user interface;
   selecting among the subset of available deliverable customizations of a user interface deliverable in response to the user interface request, the selection based at least in part on the form factor identification in the user agent string, the user ID, and determining the organization ID, wherein each user interface with deliverable customization includes:
      common code that combines with the deliverable customizations;
      at least one feature selected based on a role associated with the user ID;
      injected header information dependent on the selected deliverable customization, the injected header information including a portion of inherited header information applicable to the available deliverable customizations, the portion selected based at least in part on a user preference associated with the user ID and the form factor identification, wherein the injected header information controls:
         user interface placement and behavior of a search feature implemented by the common code;
         user interface placement and behavior of user profile features implemented by the common code;
         user interface placement and behavior of primary menued features implemented by the common code; and
   delivering the deliverable customization to the requesting user's device for rendering at the user device, the deliverable customization including metadata selected based at least in part on the form factor identification in the user agent string and user ID.

2. The method of claim 1 further including receiving an organization ID.

3. The method of claim 1, further including accessing an organization ID based on the user ID.

4. The method of claim 1, including:
   retrieving permissions and preferences for a user, based at least in part on the user ID and determining the organization type; and
   limiting options available for selection as available deliverable customization based on the permissions and preferences.

5. The method of claim 1, wherein the injected header information further controls user interface placement and behavior of notification features.

6. The method of claim 1, wherein the injected header information further controls user interface placement and behavior of at least one performance fuel gauge available in a developer mode.

7. The method of claim 6, wherein the performance fuel gauge registers memory usage.

8. The method of claim 6, wherein the performance fuel gauge indicates battery drain.

9. The method of claim 6, wherein the performance fuel gauge indicates bandwidth usage.

10. The method of claim 1, wherein the injected header information further includes placement and behavior of additional menued features implemented by a noncommon code segment.

11. The method of claim 1, further including limiting code delivery to the selected deliverable customization, wherein bandwidth used and load time are reduced.

12. A computer implemented system applied to delivering a customized user interface, the computer implemented system including:
   a processor, memory coupled to the processor, and program instructions stored in the memory that implement a method comprising:
   receiving a user interface request at a server;
   receiving a user agent string with a form factor identification and a user ID;
   determining an organization ID based at least in part on receiving the user agent string with the form factor identification and the user ID, wherein the organization ID is associated with a subset of available deliverable customizations of a user interface;
   selecting among the subset of available deliverable customizations of a user interface deliverable in response to the user interface request, the selection based at least in part on the form factor identification in the user agent string, the user ID, and determining the organization ID, wherein each user interface with deliverable customization includes:
      common code that combines with the deliverable customizations;
      at least one feature selected based on a role associated with the user ID;
      injected header information dependent on the selected deliverable customization, the injected header information including a portion of inherited header information applicable to the available deliverable customizations, the portion selected based at least in part on a user preference associated with the user ID and the form factor identification, wherein the injected header information controls:
         user interface placement and behavior of a search feature implemented by the common code;
         user interface placement and behavior of user profile features implemented by the common code;
         user interface placement and behavior of primary menued features implemented by the common code; and
   delivering the deliverable customization to the requesting user's device for rendering at the user device, the deliverable customization including metadata selected based at least in part on the form factor identification in the user agent string and user ID.

13. The computer implemented system of claim 12, further including receiving an organization ID.

14. The computer implemented system of claim 12, wherein the injected header information further controls user interface placement and behavior of notification features.

15. The computer implemented system of claim 12, wherein the injected header information further controls user interface placement and behavior of at least one performance fuel gauge available in a developer mode.

16. The computer implemented system of claim 15, wherein the performance fuel gauge registers memory usage.

17. The computer implemented system of claim 12, wherein the injected header information further includes placement and behavior of additional menued features implemented by a non-common code segment.

18. The computer implemented system of claim 12, further including limiting code delivery to the selected deliverable customization, wherein bandwidth used and load time are reduced.

19. A tangible non-transitory computer readable storage medium that stores program instructions that implement a method of to delivering a customized user interface, the implementation including:
   receiving a user interface request at a server;
   receiving a user agent string with a form factor identification and a user ID;
   determining an organization ID based at least in part on receiving the user agent string with the form factor identification and the user ID, wherein the organization ID is associated with a subset of available deliverable customizations of a user interface;
   selecting among the subset of available deliverable customizations of a user interface deliverable in response to the user interface request, the selection based at least in part on the form factor identification in the user agent string, the user ID, and determining the organization ID, wherein each user interface with deliverable customization includes:
      common code that combines with the deliverable customizations;
      at least one feature selected based on a role associated with the user ID;
      injected header information dependent on the selected deliverable customization, the injected header information including a portion of inherited header information applicable to the available deliverable customizations, the portion selected based at least in part on a user preference associated with the user ID and the form factor identification, wherein the injected header information controls:
         user interface placement and behavior of a search feature implemented by the common code;
         user interface placement and behavior of user profile features implemented by the common code;
         user interface placement and behavior of primary menued features implemented by the common code; and
   delivering the deliverable customization to the requesting user's device for rendering at the user device, the deliverable customization including metadata selected based at least in part on the form factor identification in the user agent string and user ID.

20. The tangible non-transitory computer readable storage medium of claim 19, further including accessing an organization ID based on the user ID.

21. The tangible non-transitory computer readable storage medium of claim 19, including:
   retrieving permissions and preferences for a user, based at least in part on the user ID and determining the organization type; and
   limiting options available for selection as available deliverable customization based on the permissions and preferences.

22. The tangible non-transitory computer readable storage medium of claim 19, wherein the injected header information further includes placement and behavior of additional menued features implemented by a non-common code segment.

23. The tangible non-transitory computer readable storage medium of claim 19, further including limiting code delivery to the selected deliverable customization, wherein bandwidth used and load time are reduced.

* * * * *